(12) United States Patent
Batson et al.

(10) Patent No.: US 6,400,043 B1
(45) Date of Patent: Jun. 4, 2002

(54) MODULAR UNINTERRUPTABLE POWER SUPPLY

(75) Inventors: John Gary Batson, Duluth; Ehsan Chitsazan, Cumming; James M. Rhodes, Sugar Hill, all of GA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 09/451,386

(22) Filed: Nov. 30, 1999

Related U.S. Application Data

(60) Provisional application No. 60/110,256, filed on Nov. 30, 1998.

(51) Int. Cl.$^7$ ................................................. H02J 9/00
(52) U.S. Cl. ......................... 307/66; 363/56.02; 363/98
(58) Field of Search ..................... 307/64, 66; 361/600, 361/601, 623, 728, 729, 730, 731, 752; 174/52.1, 59; 363/21.06, 21.08, 21.14, 21.16, 56.02, 56.03, 98, 132; 320/128, 140, DIG. 28

(56) References Cited

U.S. PATENT DOCUMENTS

| | | | | |
|---|---|---|---|---|
| 4,638,178 A | * | 1/1987 | Kayser | 307/66 |
| 4,675,538 A | * | 6/1987 | Epstein | 307/66 |
| 4,745,299 A | * | 5/1988 | Eng et al. | 307/66 |
| 4,748,342 A | * | 5/1988 | Dijkmans | 307/66 |

(List continued on next page.)

*Primary Examiner*—Fritz Fleming
*Assistant Examiner*—Roberto J. Rios

(57) ABSTRACT

An uninterruptable power supply includes a rechargeable battery, having a positive terminal and a negative terminal, and a transformer. The transformer includes a battery side transformer winding having a first terminal, a second terminal and a third terminal; a load side transformer winding inductively coupled to the battery side transformer winding via a core; and a power supply side transformer winding that is inductively coupled to the battery side transformer winding via the core. An inverter bridge circuit couples the positive terminal of the battery to the first terminal of the battery side transformer winding and couples the negative terminal of the battery to the second terminal and the third terminal of the battery side transformer winding. The inverter bridge circuit includes a switching circuit that forms a bridge circuit that allows current from the battery side transformer winding to flow in only one direction into the battery when the switching circuit is in a first switching state so that current from the power supply slide transformer winding induces an alternating current in the battery side transformer winding that passes through the bridge circuit to generate a direct current that charges the battery when the switching circuit is in the first switching state. The switching circuit also forms an inverter circuit that generates an alternating current from a direct current supplied by the battery when the switching circuit is in a second switching state, thereby inducing an alternating current in the load side transformer winding. A control circuit drives the switching circuit into the first switching state when at least a predetermined power level is supplied to the power side transformer winding. The control circuit also drives the switching circuit into the second switching state when less than the predetermined power level is supplied to the power side transformer winding.

11 Claims, 2 Drawing Sheets

U.S. PATENT DOCUMENTS

| | | | |
|---|---|---|---|
| 5,182,518 A | * 1/1993 | Stich et al. | 307/66 |
| 5,483,463 A | * 1/1996 | Qin et al. | 307/66 |
| 5,563,778 A | * 10/1996 | Oh | 307/66 |
| 5,615,129 A | * 3/1997 | Stich et al. | 307/66 |
| 5,616,968 A | * 4/1997 | Fujii et al. | 307/66 |
| 5,670,833 A | * 9/1997 | Mengelt et al. | 307/66 |
| 5,760,495 A | * 6/1998 | Mekanik | 307/66 |
| 5,801,513 A | * 9/1998 | Smith et al. | 307/66 |
| 5,804,890 A | * 9/1998 | Kakalec et al. | 307/66 |
| 5,845,217 A | * 12/1998 | Lindell et al. | 455/557 |
| 5,856,712 A | * 1/1999 | Suzuki et al. | 307/66 |
| 5,886,880 A | * 3/1999 | Hisanaga | 307/66 |
| 6,115,268 A | * 9/2000 | Chang et al. | 307/66 |
| 6,121,695 A | * 9/2000 | Loh | 307/64 |
| 6,121,756 A | * 9/2000 | Johnson et al. | 320/140 |
| 6,198,177 B1 | * 3/2001 | Mao et al. | 307/66 |
| 6,201,319 B1 | * 3/2001 | Simonelli et al. | 307/66 |
| 6,218,744 B1 | * 4/2001 | Zahrte, Sr. et al. | 307/66 |
| 6,339,314 B1 | * 1/2002 | Bruning | 320/128 |

* cited by examiner

MODULAR UNINTERRUPTABLE POWER SUPPLY

CROSS-REFERENCE TO RELATED APPLICATION

The present application claims the benefit of priority of U.S. Provisional Patent Application Ser. No. 60/110,256 filed Nov. 30, 1998, entitled "Power Supply".

TECHNICAL FIELD

The present invention relates to power supplies and, more specifically, to an uninterruptable power supply.

BACKGROUND OF THE INVENTION

Existing uninterruptable power supplies supply back up alternating current to electronic components in the event of normal power interruption. Such power supplies typically include a rechargeable battery, a rectifier circuit for recharging the battery and an inverter for producing alternating current from the battery. They also include a transformer that includes windings for transforming normal service power to a load, auxiliary windings for battery charging, and windings for transforming battery-supplied alternating current to a load. The auxiliary windings add cost and complexity to the power supply. Also, existing power supplies are susceptible to certain damage from battery lead reversal or short-circuit.

Such existing power supplies are typically sold as single units that are bulky to ship and require replacement of the entire unit if a single component fails. The likelihood of component failure is increased as a result of there being a common housing for both the transformer, and the associated electronics. This is because removal of heat from all of the components usually requires a fan that is subject to mechanical failure. Also, a power supply produced as a single unit does not lend itself to upgrading of a single component. Upgrading of electronics occurs relatively frequently because advances in electronics occur relatively frequently, but upgrading of transformers does not occur as frequently because transformer technology does not change as frequently.

Therefore, there is a need for an uninterruptable power supply that uses a single set of windings both for recharging the battery and for supplying inverter power to the transformer. There is also a need for a modular power supply that allows for separate shipping and sale of both the transformer and associated electronics.

SUMMARY OF THE INVENTION

The disadvantages of the prior art are overcome by the present invention which, in one aspect, is an uninterruptable power supply with an external or internal rechargeable battery having a positive terminal and a negative terminal, and a transformer. The transformer includes: a battery side transformer winding having a first terminal, a second terminal and a third terminal; a load side transformer winding inductively coupled to the battery side transformer winding via a core; and a power supply side transformer winding that is inductively coupled to the battery side transformer winding via the core. An inverter circuit couples the positive terminal of the battery to the first terminal of the battery side transformer winding and couples the negative terminal of the battery to the second terminal and the third terminal of the battery side transformer winding. The inverter circuit includes a switching circuit that forms a bridge rectifier circuit that allows current from the battery side transformer winding to flow in only one direction into the battery when the switching circuit is in a first switching state (operating from mains) so that current from the power supply side transformer winding induces an alternating current in the battery side transformer winding that passes through the bridge circuit to generate a direct current that charges the battery when the switching circuit is in the first switching state. The switching circuit also forms a push-pull inverter circuit that generates an alternating current from a direct current supplied by the battery when the switching circuit is in a second switching state (operating from batteries), thereby inducing an alternating current in the load side transformer winding. A control circuit drives the switching circuit into the first switching state when at least a predetermined power level is supplied to the power side transformer winding. The control circuit also drives the switching circuit into the second switching state when less than the predetermined power level is supplied to the power side transformer winding. Aside from the reduction in transformer windings, the mode switching circuit provides protection from battery lead reversal or short-circuits, such as may occur during installation or maintenance.

In another aspect, the invention is an uninterruptable power supply that includes a transformer module that is disposed in a first enclosure. The transformer module includes a transformer that is couplable to both a charging power source and a load. The first enclosure includes a first interior wall with a first electrical connector affixed thereto. The first electrical connector is electrically coupled to a battery side winding of the transformer. The uninterruptable power supply also includes an electronics module disposed in a second enclosure different from the first enclosure. The second enclosure includes a second interior wall that is complementary in shape to the first interior wall. The electronics module interfaces to an internal or external rechargeable battery that is capable of supplying a direct current. The module includes an inverter, electrically coupled to the battery, that is capable of generating an alternating current from the direct current; a recharging circuit that is capable of selectively providing direct current to the battery; and a second electrical connector, affixed to the second interior wall and complementary to the first electrical connector. The second electrical connector is electrically coupled to both the inverter and the recharging circuit so that both the inverter and the recharging circuit may be electrically coupled to the battery side winding of the transformer by physically coupling the first electrical connector to the second electrical connector.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
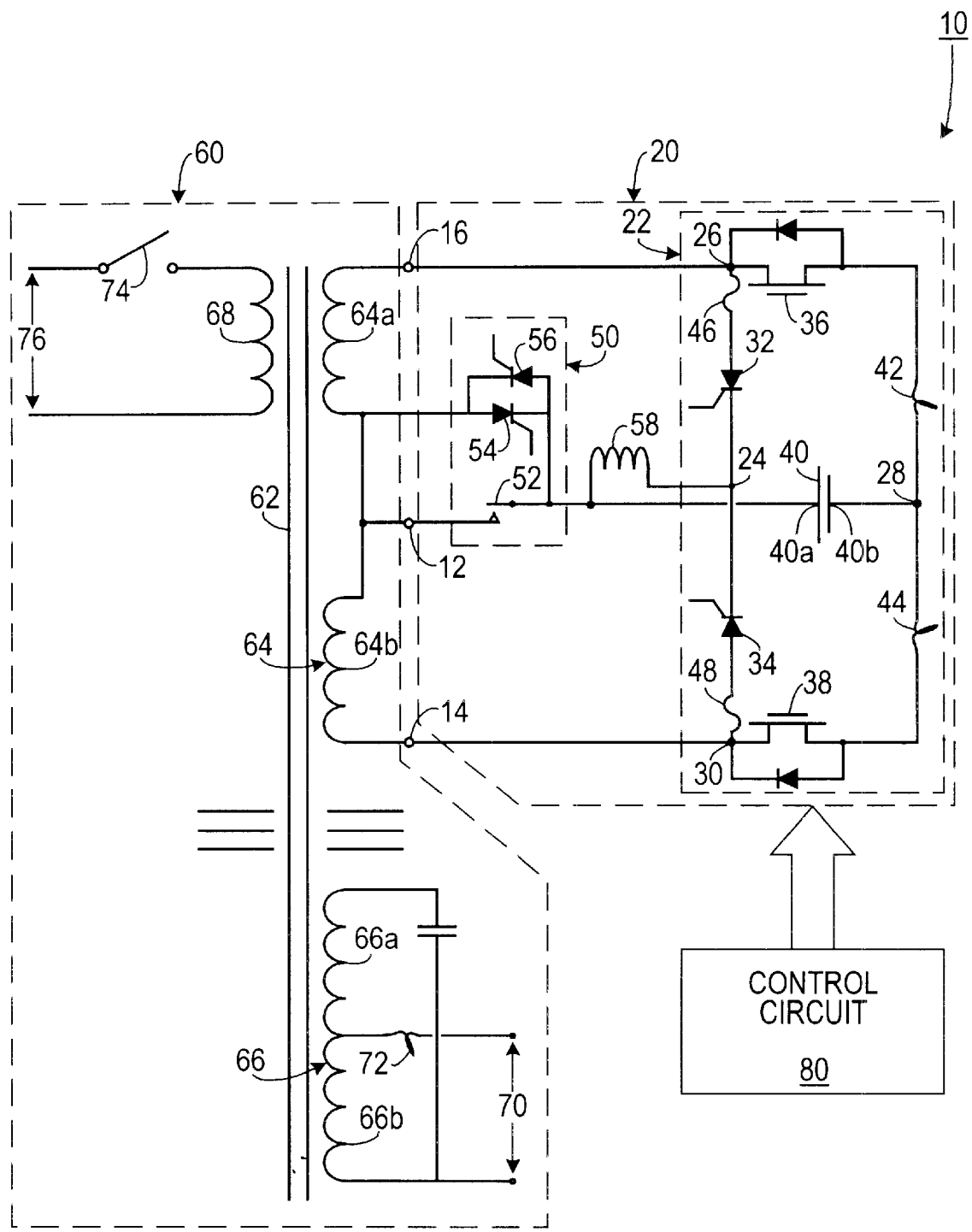
FIG. 1 is a schematic diagram of a circuit in accordance with one embodiment of the invention.

A preferred embodiment of the invention is now described in detail. Referring to the drawings, like numbers indicate like parts throughout the views. As shown in FIG. 1, the invention is an uninterruptable power supply 10 that includes an inverter and charging circuit 20 and a control circuit 80 as part of an electronics module and a transformer module 60. The inverter and charging circuit 20 connects to an internal or external rechargeable battery 40 having a positive terminal and a negative terminal. The transformer module 60 houses a transformer that includes a battery side transformer winding 64 (shown as having a first portion 64a and a second portion 64b) having a first terminal 12, a second terminal 16 and a third terminal 14. A load side transformer winding 66 (shown as having a first portion 66a and a second portion 66b) is inductively coupled to the battery side transformer winding 64 via a core 62. The load side transformer winding 66 may be electrically coupled to a load 70. A power supply side tansformer winding 68, capable of receiving normal service power 76, is also inductively coupled to the battery side transformer winding 64 via the core. A switch 74 may be supplied to isolate the power supply side transformer winding 68 from service power 76.

The inverter, and charging circuit 20 couples the positive terminal 40a of the battery 40 to the first terminal 12 of the battery side transformer winding 64 and couples the negative terminal of the battery 40b to the second terminal 16 and the third terminal 14 of the battery side transformer winding 64. The inverter and charging circuit 20 includes a switching circuit 22 that forms a bridge circuit that allows current from the battery side transformer winding 64 to flow in only one direction into the battery 40 when the switching circuit 50 is in a first switching state. The first switching state may be electrically defined as having thyristors 54 and 56, and relay 52 de-energized and open, and relay 74 de-energized and closed. Current from the power supply side transformer winding 68 induces an alternating current in the battery side transformer winding 64 that passes through the bridge circuit formed by thyristors 32 and 34, and parasitic diodes 36 and 38 to generate a direct current that charges the battery 40 when the switching circuit 22 is in the first switching state. The switching circuit 22 also forms a push-pull inverter circuit that generates an alternating current from a direct current supplied by the battery 40 when the switching circuit 22 is in a second switching state, thereby inducing an alternating current in the load side transformer winding 66. The second switching state may be defined as having thyristors 54 and 56, and relay 52 energized and closed, and relay 74 energized and open.

A control circuit 80 drives the switching circuits 22 and 50 into the first switching state when at least a predetermined power level is supplied to the power side transformer winding 68 (i.e., when normal power is being supplied to the power side transformer winding 68). The control circuit 80 drives the switching circuits 22 and 50 into the second switching state when less than the predetermined power level is supplied to the power side transformer winding 68 (i.e., when normal power to the power side transformer winding 68 is interrupted, such as due to a power outage).

The inverter and charging circuit 20 has a first node 24 electrically coupled to the positive terminal 40a of the battery 40, a second node 26 electrically coupled to the second terminal 16 of the battery side winding 64, a third node 28 electrically coupled to the negative terminal 40b of the battery 40 and a fourth node 30 electrically coupled to the third terminal 14 of the battery side winding 64.

The inverter and charging circuit 20 includes a first transistor 36 coupling the second node 26 to the third node 28 and biased so as to be capable of conducting current in either direction between the third node 28 and the second node 26 when the first transistor 36 is in a first transistor state. The first transistor 36 is capable of conducting current flowing only from the second node 26 to the third node 28 when the first transistor 36 is in a second transistor state (to demonstrate this relationship, FIG. I shows the first transistor 36 as a field effect transistor (FET) in parallel with a diode). The inverter and charging circuit 20 may also include current sensors 42 and 44 to sense current flow to the battery 40.

A second transistor 38 couples the fourth node 30 to the third node 28 and is biased so as to be capable of conducting current flowing in either direction between the third node 28 and the fourth node 30 when the second transistor 38 is in a first transistor state and capable of conducting current flowing only from the fourth node 30 to the third node 28 when the second transistor 38 is in a second transistor state. The first transistor state and the second transistor state is determined by a signal level supplied to the gating junction of the first transistor and the second transistor by the control circuit 80. Fuses 46 and 48 may also be provided for circuit protection.

A first silicon controlled rectifier (SCR) 32 electrically couples the second node 26 to the first node 24 and is biased so as to be capable of conducting current flowing only from the second node 26 to the first node 24 when the first SCR 32 is in a conductive state. The first SCR 32 also acts as an open circuit when the first SCR 32 is in a non-conductive state. A second SCR 34 electrically couples the fourth node 30 to the first node 24 and is biased so as to be capable of conducting current flowing only from the fourth node 30 to the first node 24 when the second SCR is in a conductive state. The second SCR 34 also acts as an open circuit when the second SCR is in a non-conductive state. Whether the first SCR 32 and the second SCR 34 are in the conductive state depends on a signal value from the control circuit 80 applied to the control input of the SCR.

The control circuit 80 (the function of which includes that of an inverter control circuit) is electrically coupled to the gates of the first transistor 36 and to the second transistor 38. The control circuit 80 alternately generates a first inverter control signal value and a second inverter control signal value when the switching circuit 22 is in a second switching state. The first inverter control signal value drives the first transistor 36 into the first transistor state and the second transistor 38 into the second transistor state. The second inverter control signal value drives the first FET 36 into the second transistor state and the second FET 38 into the first transistor state. By alternately generating the first inverter control signal value and the second inverter control signal value, the control circuit 80 causes the inverter and charging circuit 20 to generate an alternating current from the direct current of the battery 40.

A power supply switch 50 electrically couples the positive terminal 40a of the battery to the first terminal 12 of the battery side transformer winding 64 when the switching circuit 22 is in the second switching state and electrically decouples the positive terminal 40a of the battery from the first terminal 12 of the battery side transformer winding 64 when the switching circuit 22 is in the first switching state. The power supply switch 50 includes a relay 52 that electrically couples the positive terminal 40a of the battery 40 to the first terminal 12 of the battery side transformer winding 64 when the relay 52 is closed and that electrically decouples the positive terminal 40a of the battery 40 from the first terminal 12 of the battery side transformer winding 64 when the relay 52 is open. Also, to provide immediate back-up power (during the time it takes the relay 52 to close), the power supply switch 50 includes a third SCR 56 that allows current to flow in a first direction and fourth SCR 54 that allows current to flow in a second direction opposite the first direction. The third SCR 56 and the fourth SCR 54 are electrically coupled in parallel so that current may flow in either the first direction or the second direction when both the third SCR 56 and the fourth SCR 54 are in a conductive state. The third SCR 56 and the fourth SCR 54 electrically couple the positive terminal 40a of the battery 40 to the first terminal 12 of the battery side transformer winding 64 when they are in a transmissive state. The third SCR 56 and the fourth SCR 54 are driven to the transmissive state and the relay 52 is closed by the control circuit 80 upon to onset of a interruption of service power 76 to the power supply side transformer winding 68. An inductor 58, electrically coupling charging SCRs 32 and 34 to the battery positive terminal 40a, provides charge current ripple filtering when the circuit is in the first switching state.

The inverter and charging circuit 20 and the switch circuit 50 of this embodiment of the invention allows the battery side winding 64 to be used both in recharging the battery 40 when normal power is available and in supplying back up power from the battery 40 when normal power is interrupted. This is done without requiring an extra winding. Switch circuit 50, being normally open, additionally prevents damaging currents from flowing if battery 40 is connected backwards or if the battery connecting leads are shorted during product application.

Figure 2:
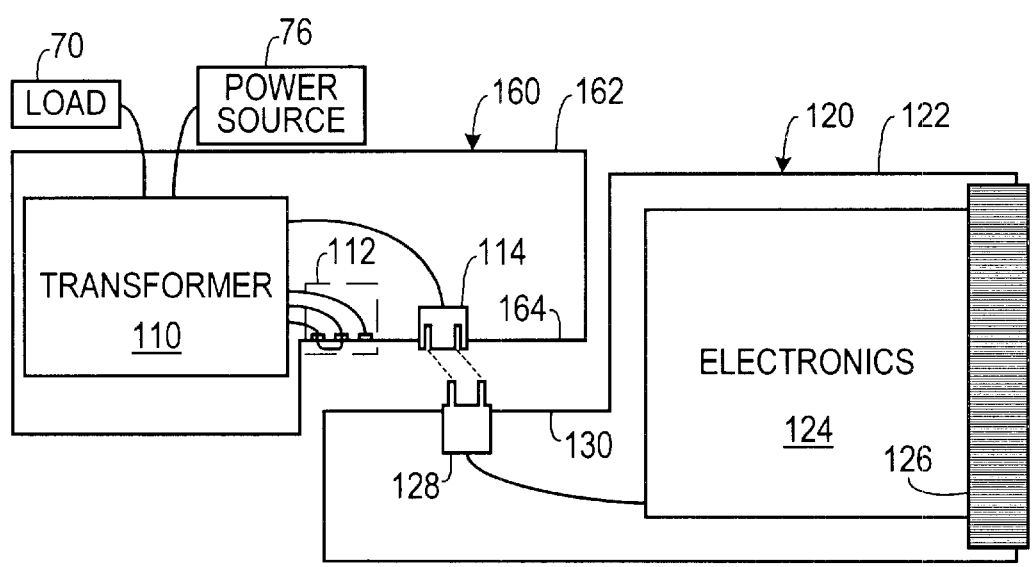
FIG. 2 is a block diagram showing one layout of the major elements of one embodiment of the invention.

As shown in FIG. 2, the uninterruptable power supply includes a transformer module 160, disposed in a first enclosure 162. The transformer module 160 includes a transformer 110 that is couplable to both a charging power source 76 and a load 70. The first enclosure 162 includes a first interior wall 164 and a first electrical connector 114 (which could be, e.g., either a male electrical plug or a female electrical plug) affixed thereto. The first electrical connector 114 is electrically coupled to a battery side winding 64 (as shown in FIG. 1) of the transformer 110. The transformer module also includes an opening for venting heat from the transformer module.

An electronics module 120 is disposed in a second enclosure 122. The second enclosure 122 includes a second interior wall 130 that is complementary in shape to the first interior wall 164. The electronics module includes continuous power supply electronics 124, such as the control circuits, an inverter and a recharging circuit (examples of these items were discussed above with reference to the embodiment shown in FIG. 1).

A second electrical connector 128 (which could be, e.g., either a male electrical plug or a female electrical plug, so long as it is of opposite gender from the first electrical connector 114) is affixed to the second interior wall 130 and is complementary to the first electrical connector 114. The second electrical connector 128 is electrically coupled to both the inverter and the recharging circuit. Both the inverter and the recharging circuit may be electrically coupled to the battery side winding of the transformer 110 by physically coupling the first electrical connector 114 to the second electrical connector 128.

The electronics module 120 may also include a heat sink 126 disposed along an exterior surface of the electronics module 120 and spaced apart from the second interior wall 130 so as to transmit from the electronics module 120 at least a portion of any heat generated within the electronics module 120. Placing the heat sink 126 away from the transformer 110 simplifies cooling of the power supply.

One or more voltage control jumpers 112 may be disposed on the first interior wall 112 to allow for changes in voltage standard of the power source 76, etc. By placing the jumpers 112 on the first interior wall 112, they will be accessible when the first electrical connector 114 is not physically coupled to the second electrical connector 128, but will be inaccessible when the first electrical connector 114 is physically coupled to the second electrical connector 128, thereby preventing unauthorized access to the jumpers 112.

The modularity of this embodiment of the invention allows the uninterruptable power supply to be shipped, sold, upgraded, or installed as separate units. Also, by separating the transformer module 160 from the electronics module 120, heat removal becomes less costly and makes the power supply less susceptible to heat-related failure.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An uninterruptable power supply, comprising:
   a. a rechargeable battery having a positive terminal and a negative terminal;
   b. a transformer, comprising:
      i. a battery side transformer winding having a first terminal, a second terminal and a third terminal;
      ii. a load side transformer winding inductively coupled to the battery side transformer winding via a core; and iii. a power supply side transformer winding that is inductively coupled to the battery side transformer winding via the core;

c. an inverter bridge circuit that couples the positive terminal of the battery to the first terminal of the battery side transformer winding and that couples the negative terminal of the battery to the second terminal and the third terminal of the battery side transformer winding, wherein the inverter bridge circuit has a first node electrically coupled to the positive terminal of the battery, a second node electrically coupled to the second terminal of the battery side winding, a third node electrically coupled to the negative terminal of the battery and a fourth node electrically coupled to the third terminal of the battery side winding, the inverter bridge circuit comprising:
   i. a first field effect transistor coupling the second node to the third node and biased so as to be capable of conducting current flowing only from the third node to the second node when the first field effect transistor is in a first transistor state and capable of conducting current flowing from the second node to the third node when the first field effect transistor is in a second transistor state;
   ii. a second field effect transistor coupling the fourth node to the third node and biased so as to be capable of conducting current flowing only from the third node to the fourth node when the second field effect transistor is in a first transistor state and capable of conducting current flowing from the fourth node to the third node when the second field effect transistor is in a second transistor state;
   iii. a first silicon controlled rectifier electrically coupling the second node to the first node and biased so as to be capable of conducting current flowing only from the second node to the first node when the first silicon controlled rectifier is in a conductive state and so as to act as an open circuit when the first silicon controlled rectifier is in a non-conductive state; and
   iv. a second silicon controlled rectifier electrically coupling the fourth node to the first node and biased so as to be capable of conducting current flowing only from the fourth node to the first node when the second silicon controlled rectifier is in a conductive state and so as to act as an open circuit when the second silicon controlled rectifier is in a non-conductive state and
   v. a switching circuit that:
      i. forms a bridge circuit that allows current from the battery side transformer winding to flow in only one direction into the battery when the switching circuit is in a first switching state so that current from the power supply side transformer winding induces an alternating current in the battery side transformer winding that passes through the bridge circuit to generate a direct current that charges the battery when the switching circuit is in the first switching state; and
      ii. forms an inverter circuit that generates an alternating current from a direct current supplied by the battery when the switching circuit is in a second switching state, thereby inducing an alternating current in the load side transformer winding; and d. a control circuit that drives the switching circuit into the first switching state when at least a predetermined power level is supplied to the power side transformer winding and that drives the switching circuit into the second switching state when less than the predetermined power level is supplied to the power side transformer winding.

2. The uninterruptable power supply of claim 1, further comprising an inverter control circuit, electrically coupled to the first field effect transistor and to the second field effect transistor, that alternately generates a first inverter control signal value and a second inverter control signal value when the switching circuit is in a second switching state, wherein:
   a. the first inverter control signal value drives the first field effect transistor into the first transistor state and the second field effect transistor into the second transistor state; and
   b. the second inverter control signal value drives the first field effect transistor into the second transistor state and the second field effect transistor into the first transistor state.

3. The uninterruptable power supply of claim 1, further comprising a power supply switch that electrically couples the positive terminal of the battery to the first terminal of the battery side transformer winding when the switching circuit is in the second switching state and that electrically decouples the positive terminal of the battery from the first terminal of the battery side transformer winding when the switching circuit is in the first switching state.

4. The uninterruptable power supply of claim 3, wherein the power supply switch comprises:
   a. a relay that electrically couples the positive terminal of the battery to the first terminal of the battery side transformer winding when the relay is closed and that electrically decouples the positive terminal of the battery from the first terminal of the battery side transformer winding when the relay is open;
   b. a third silicon controlled rectifier that allows current to flow in a first direction and fourth silicon controlled rectifier that allows current to flow in a second direction opposite the first direction, the third silicon controlled rectifier and the fourth silicon controlled rectifier electrically coupled in parallel so that current may flow in either the first direction or the second direction when both the third silicon controlled rectifier and the fourth silicon controlled rectifier are in a conductive state, the third silicon controlled rectifier and the fourth silicon controlled rectifier electrically coupling the positive terminal of the battery to the first terminal of the battery side transformer winding.

5. The uninterruptable power supply of claim 4, further comprising an inductor electrically coupling the relay and the third silicon controlled rectifier and the fourth silicon controlled rectifier to the first node of the inverter bridge circuit.

6. An uninterruptable power supply, comprising:
   a. a transformer module, disposed in a first enclosure, including a transformer that is couplable to both a charging power source and a load, the first enclosure including a first interior wall, a first electrical connector affixed thereto, the first electrical connector being electrically coupled to a battery side winding of the transformer; and
   b. an electronics module disposed in a second enclosure different from the first enclosure, the second enclosure including a second interior wall that is complementary in shape to the first interior wall, the electronics module comprising:

i. a rechargeable battery that is capable of supplying a direct current;

ii. an inverter, electrically coupled to the battery, that is capable of generating an alternating current from the direct current;

iii. a recharging circuit that is capable of selectively providing direct current to the battery, and iv. a second electrical connector, affixed to the second interior wall and complimentary to the first electrical connector, that is electrically coupled to both the inverter and the recharging circuit so that both the inverter and the recharging circuit may be electrically coupled to the battery side winding of the transformer by physically coupling the first electrical connector to the second electrical connector.

7. The uninterruptable power supply of claim 6, wherein the electronics module comprises a heat sink disposed along an exterior surface of the electronics module and spaced apart from the second interior wall so as to transmit from the electronics module at least a portion of any heat generated within the electronics module.

8. The uninterruptable power supply of claim 6, further comprising at least one voltage control jumper disposed on the first interior wall, the at least one jumper being accessible when the first electrical connector is not physically coupled to the second electrical connector and being inaccessible when the first electrical connector is physically coupled to the second electrical connector.

9. The uninterruptable power supply of claim 6, wherein the first electrical connector is a male electrical plug and wherein the second electrical connector is a female electrical plug.

10. The uninterruptable power supply of claim 6, wherein the second electrical connector is a male electrical plug and wherein the first electrical connector is a female electrical plug.

11. The uninterruptable power supply of claim 6, wherein the transformer module defines an opening for venting heat from the transformer module.

* * * * *